United States Patent
Tawada et al.

(10) Patent No.: US 12,556,109 B2
(45) Date of Patent: Feb. 17, 2026

(54) EXTERNAL STORAGE DEVICE FOR CONTROL APPARATUS OF POWER CONVERSION SYSTEM, AND CONTROL APPARATUS OF POWER CONVERSION SYSTEM

(71) Applicant: TMEIC Corporation, Chuo-ku (JP)

(72) Inventors: Yoshihiro Tawada, Tokyo (JP);
Tomoya Katsukura, Tokyo (JP);
Daichi Yamashita, Hyogo (JP);
Masahiro Ushiro, Hyogo (JP)

(73) Assignee: TMEIC Corporation, Chuo-ku (JP)

( * ) Notice: Subject to any disclaimer, the term of this patent is extended or adjusted under 35 U.S.C. 154(b) by 313 days.

(21) Appl. No.: 18/004,928

(22) PCT Filed: Jun. 29, 2021

(86) PCT No.: PCT/JP2021/024592
§ 371 (c)(1),
(2) Date: Jan. 10, 2023

(87) PCT Pub. No.: WO2023/276004
PCT Pub. Date: Jan. 5, 2023

(65) Prior Publication Data
US 2023/0246565 A1    Aug. 3, 2023

(51) Int. Cl.
*G06F 3/06*     (2006.01)
*H02M 7/48*    (2007.01)

(52) U.S. Cl.
CPC ............ *H02M 7/48* (2013.01); *G06F 3/0604* (2013.01); *G06F 3/0643* (2013.01); *G06F 3/0673* (2013.01)

(58) Field of Classification Search
CPC ...... G06F 3/0643; G06F 3/0673; H02M 7/48; H02M 7/53873
See application file for complete search history.

(56) References Cited

U.S. PATENT DOCUMENTS

2006/0090030 A1* 4/2006 Ijdens ................ G11B 27/11
711/111
2009/0327059 A1* 12/2009 Grigorovitch ......... G06Q 40/12
705/14.15

(Continued)

FOREIGN PATENT DOCUMENTS

JP    10-201105 A    7/1998

OTHER PUBLICATIONS

Pachauri, R. K., Pandey, J. K., Sharma, A., Nautiyal, O. P., & Ram, M. (Eds.). (2021). Applied soft computing and embedded system applications in solar energy (First edition.). CRC Press. (Year: 2021).*

(Continued)

*Primary Examiner* — Reginald G Bragdon
*Assistant Examiner* — Zakaria Mohammed Belkhayat
(74) *Attorney, Agent, or Firm* — Oblon, McClelland, Maier & Neustadt, L.L.P.

(57) ABSTRACT

An external storage device for a control apparatus of a power conversion system to which data from a power conversion system can be written even by a program small in size. The external storage device for the control apparatus of the power conversion system includes: a plurality of file storage areas each configured to store data from the power conversion system; and a file management area configured to manage data for setting a format not using a file system applied to a terminal apparatus, as a format for storage of the data in the plurality of file storage areas.

9 Claims, 5 Drawing Sheets

(56) References Cited

U.S. PATENT DOCUMENTS

| | | | |
|---|---|---|---|
| 2010/0152910 A1* | 6/2010 | Taft | H02H 3/042 |
| | | | 700/286 |
| 2011/0023083 A1* | 1/2011 | Eom | H04L 63/10 |
| | | | 726/4 |
| 2016/0342186 A1* | 11/2016 | Ragupathi | G06F 1/189 |
| 2020/0143016 A1* | 5/2020 | Borkar | G06F 21/16 |
| 2022/0278630 A1* | 9/2022 | Ueda | H02M 7/537 |
| 2022/0329070 A1* | 10/2022 | Chen | G05B 19/042 |

OTHER PUBLICATIONS

"IEEE Recommended Practice for Power Quality Data Interchange Format (PQDIF)—Redline," in IEEE Std 1159.Mar. 2019 (Revision of IEEE Std 1159.3-2003)—Redline , vol. No., pp. 1-313, May 1, 2019. (Year: 2019).*

International Search Report & Written Opinion issued Sep. 14, 2021 in PCT/JP2021/024592, filed on Jun. 29, 2021, 10 pages (with English Translation).

* cited by examiner

EXTERNAL STORAGE DEVICE FOR CONTROL APPARATUS OF POWER CONVERSION SYSTEM, AND CONTROL APPARATUS OF POWER CONVERSION SYSTEM

FIELD

The present disclosure relates to an external storage device for a control apparatus of a power conversion system, and a control apparatus of a power conversion system.

BACKGROUND

PTL 1 discloses a power system. According to the power system, one control apparatus can control operation of a plurality of power conversion systems.

CITATION LIST

Patent Literature

[PTL 1] JP H10-201105 A

SUMMARY

Technical Problem

In the control apparatus disclosed in PTL 1, however, a capacity for programs is limited. Therefore, a file system applied to a common terminal apparatus such as a personal computer cannot be adopted in some cases. In this case, data from the power conversion systems cannot be stored in a common external storage device.

The present disclosure is made to solve the above-described problems. An object of the present disclosure is to provide an external storage device for a control apparatus of a power conversion system to which data from a power conversion system can be written even by a program small in size, and a control apparatus of a power conversion system.

Solution to Problem

An external storage device for a control apparatus of a power conversion system according to the present disclosure includes: a plurality of file storage areas each configured to store data from the power conversion system; and a file management area configured to manage data for setting a format not using a file system applied to a terminal apparatus, as a format for storage of the data in the plurality of file storage areas.

A control apparatus of a power conversion system to the present disclosure includes: a data reception unit configured to receive data from a power conversion system; and a data control unit configured to write, based on the format set in the file management area, the data received by the data reception unit in the plurality of file storage areas.

Advantageous Effects of Invention

According to the present disclosure, the data is stored in the external storage device based on the format not using the file system applied to the terminal apparatus.

Therefore, the data from the power conversion system can be written even by a program small in capacity.

DESCRIPTION OF EMBODIMENTS

Figure 1:
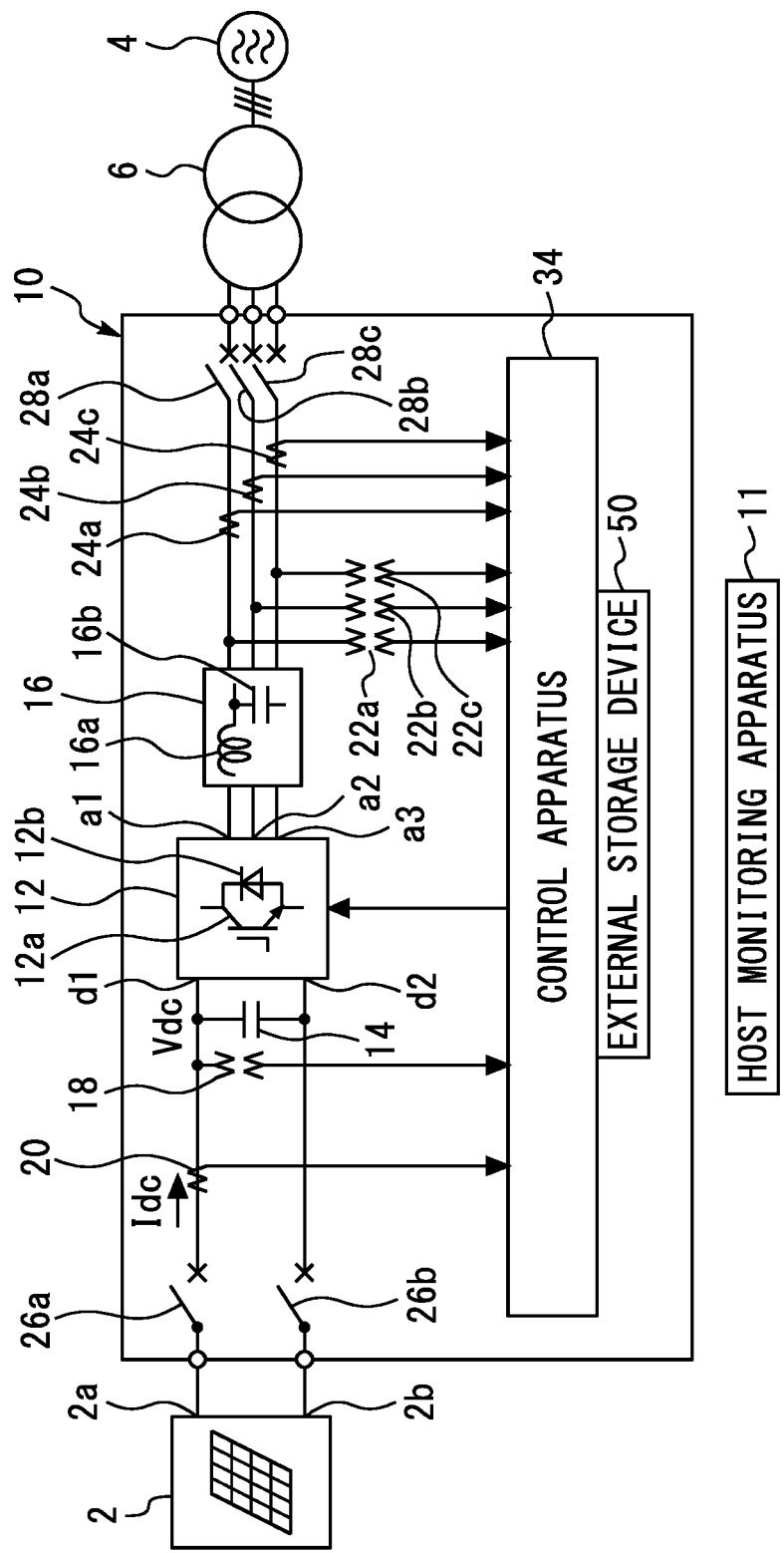
FIG. 1 is a configuration diagram of a power system to which a control apparatus of a power conversion system according to Embodiment 1 is applied.

A preferred embodiment is described with reference to accompanying drawings. Note that, in the drawings, like or equivalent parts are denoted by like reference numerals. Repetitive descriptions of the parts are appropriately simplified or omitted.

Embodiment 1

FIG. 1 is a configuration diagram of a power system to which a control apparatus of a power conversion system is applied according to Embodiment 1.

In the power system in FIG. 1, a power conversion system 10 includes a power converter 12, a direct-current capacitor 14, a filter circuit 16, a direct-current voltage detector 18, a direct current detector 20, a plurality of alternating-current voltage detectors 22a to 22c, a plurality of alternating current detectors 24a to 24c, a plurality of direct-current switches 26a and 26b, a plurality of alternating-current switches 28a to 28c and a control apparatus 34.

The power conversion system 10 is connected to a solar cell panel 2 as a direct-current power supply and to an alternating-current power system 4. The power conversion system 10 is connected to the power system 4 through, for example, a transformer 6. The solar cell panel 2 supplies direct-current power to the power conversion system 10. The power conversion system 10 converts the direct-current power supplied from the solar cell panel 2 into alternating-current power, and supplies the converted alternating-current power to the power system 4. Note that, as the direct-current power supply, a storage battery may be used in place of the solar cell panel 2.

The power conversion system 10 supplies active power and reactive power to the power system 4. The power conversion system 10 causes the solar cell panel 2 to function as, for example, a distributed power supply. Further, the power conversion system 10 performs reactive power compensation to suppress voltage fluctuation of the power system 4 by supplying reactive power to the power system 4. The power conversion system 10 performs operation to supply the active power and the reactive power during a time period when a power generation amount by the solar cell panel 2 is high, for example, during daytime.

In this example, the solar cell panel 2 is illustrated as a direct-current power supply. In this example, the alternating-current power of the power system 4 is three-phase alternating-current power. The power conversion system 10 converts the direct-current power into the three-phase alternating-current power, and supplies the three-phase alternating-current power to the power system 4. The alternating-current power of the power system 4 is not limited to the three-phase alternating-current power, and may be a single-phase alternating-current power. The alternating-current voltage of the power system 4 may be, for example, 100 V (effective value). A frequency of the alternating-current power of the power system 4 may be, for example, 50 Hz or 60 Hz.

The power converter 12 includes paired direct-current terminals d1 and d2 connected to the solar cell panel 2, and a plurality of alternating-current terminals a1 to a3 connected to the power system 4. The direct-current terminal d1 is a direct-current terminal on a high-voltage side, and the direct-current terminal d2 is a direct-current terminal on a low-voltage side. Conversely, the direct-current terminal d1 may be used on the low-voltage side, and the direct-current terminal d2 may be used on the high-voltage side.

In this example, the power converter 12 includes three alternating-current terminals a1 to a3 corresponding to respective phases of the three-phase alternating-current power. For example, in a case where the alternating-current power of the power system 4 is a single-phase alternating-current power, the number of alternating-current terminals may be two. The number of alternating-current terminals may be appropriately set based on a form of the alternating-current power.

The power converter 12 converts the direct-current power of the solar cell panel 2 into the alternating-current power corresponding to the power system 4, and supplies the alternating-current power to the power system 4. The power converter 12 includes, for example, a plurality of switching elements 12a, and a plurality of rectification elements 12b connected in antiparallel with the respective switching elements 12a. The power converter 12 converts the direct-current power into the alternating-current power by turning on/off the switching elements 12a. The power converter 12 is a so-called three-phase voltage inverter.

The power converter 12 includes, for example, six switching elements 12a connected in a three-phase bridge structure, and converts the direct-current power into the three-phase alternating-current power by turning on/off the switching elements 12a. As each of the switching elements 12a, for example, a self-arc-extinguishing semiconductor device such as a GTO (Gate Turn-Off thyristor) and an IGBT (Insulated Gate Bipolar Transistor) is used.

The direct-current capacitor 14 is connected between the paired direct-current terminals d1 and d2. The direct-current capacitor 14 smooths, for example, the direct-current voltage of the solar cell panel 2. In other words, the direct-current capacitor 14 is a smoothing capacitor.

The filter circuit 16 is provided between the alternating-current terminals a1 to a3 and the power system 4. The filter circuit 16 is connected to the alternating-current terminals a1 to a3. The filter circuit 16 includes, for example, an inductor 16a and a capacitor 16b. The inductor 16a and the capacitor 16b are provided, for example, for each phase of the alternating-current power. The filter circuit 16 suppresses a harmonic component of the alternating-current power output from the power converter 12 to bring an output waveform close to a sine wave.

The direct-current voltage detector 18 detects a direct-current voltage value Vdc of the direct-current capacitor 14. In other words, the direct-current voltage detector 18 detects a voltage value of the direct-current voltage of the solar cell panel 2. In addition, the direct-current voltage detector 18 is connected to the control apparatus 34, and inputs the detected direct-current voltage value Vdc to the control apparatus 34.

The direct current detector 20 is provided between the solar cell panel 2 and the power converter 12. The direct current detector 20 detects a direct current value Idc indicating a magnitude of the direct current input to the power converter 12. The direct current detector 20 is connected to the control apparatus 34, and inputs the detected current value to the control apparatus 34.

The alternating-current voltage detectors 22a to 22c are respectively connected to the alternating-current terminals a1 to a3 through the filter circuit 16. Each of the alternating-current voltage detectors 22a to 22c detects a voltage value of the alternating-current power output from the power converter 12. In other words, each of the alternating-current voltage detectors 22a to 22c detects a voltage value of the alternating-current voltage of the power system 4. The alternating-current voltage detectors 22a to 22c detect, for example, voltage values (phase voltages) of the respective phases of the three-phase alternating-current power. Each of the alternating-current voltage detectors 22a to 22c is connected to the control apparatus 34, and inputs the detected voltage value to the control apparatus 34.

The alternating current detectors 24a to 24c are provided between the filter circuit 16 and the power system 4. Each of the alternating current detectors 24a to 24c detects the current value of the alternating-current power output from the power converter 12. In other words, each of the alternating current detectors 24a to 24c detects the current value of the alternating current of the power system 4. The alternating current detectors 24a to 24c detect the current values (phase currents) of the respective phases of the three-phase alternating-current power. Each of the alternating current detectors 24a to 24c is connected to the control apparatus 34, and inputs the detected current value to the control apparatus 34.

The direct-current switches 26a and 26b are provided between the solar cell panel 2 and the power converter 12. Each of the direct-current switches 26a and 26b may be, for example, of a manual type. Each of the direct-current switches 26a and 26b are normally in a turned-on state, and are automatically turned off by action of the control apparatus 34 or the like when any abnormality occurs.

The alternating-current switches 28a to 28c are provided between the power system 4 and the power converter 12. In a case where the voltage values detected by the alternating-current voltage detectors 22a to 22b and respective corresponding terminal voltages on the power conversion apparatus side of the transformer 6 detected by converter-side voltage detectors (not illustrated) are considered to be equal within a predetermined range, the alternating-current switches 28a to 28c are automatically turned on by, for example, action of the control apparatus 34.

Each of the direct-current switches 26a and 26b and the alternating-current switches 28a to 28c is turned off, for example, at maintenance, and the power converter 12 is disconnected from the solar cell panel 2 and the power system 4 by the turning-off. When the direct-current switches 26a and 26b and the alternating-current switches 28a to 28c are turned on, the power converter 12 is connected to the solar cell panel 2 and the power system 4.

The control apparatus 34 controls operation of the power converter 12. The control apparatus 34 controls power conversion by the power converter 12. The control apparatus 34 is connected to, for example, a gate signal terminal of each of the switching elements 12a. The control apparatus 34 controls power conversion by the power converter 12 by controlling on/off of each of the switching elements 12a.

The control apparatus 34 is provided to receive various kinds of data from the power conversion system 10. For example, the control apparatus 34 receives data on the direct-current voltage value Vdc from the direct-current voltage detector 18. For example, the control apparatus 34 receives data on the direct current value Idc from the direct current detector 20. For example, the control apparatus 34 receives data on the voltage values (phase voltages) of the respective phases of the three-phase alternating-current power from the alternating-current voltage detectors 22a to 22c. For example, the control apparatus 34 receives data on the current values (phase currents) of the respective phases of the three-phase alternating-current power from the alternating current detectors 24a to 24c.

An external storage device 50 is provided so as to be attachable/detachable to/from the control apparatus 34. The external storage device 50 is provided to exchange data with the control apparatus 34.

A host monitoring apparatus 11 is provided to transmit/receive data to/from the control apparatus 34.

During operation of the power system, the control apparatus 34 receives data on a current, a voltage, a frequency, a temperature, and the like from the power conversion system 10. During failure of the power conversion system 10, the control apparatus 34 stores the data in the external storage device 50. During failure of the power conversion system 10, the control apparatus 34 transmits the data to the host monitoring apparatus 11. The host monitoring apparatus 11 monitors a state of the power converter 12 based on the data.

The control apparatus 34 can store the data in the external storage device 50.

Next, a method of implementing the external storage device 50 is described with reference to FIG. 2.

Figure 2:
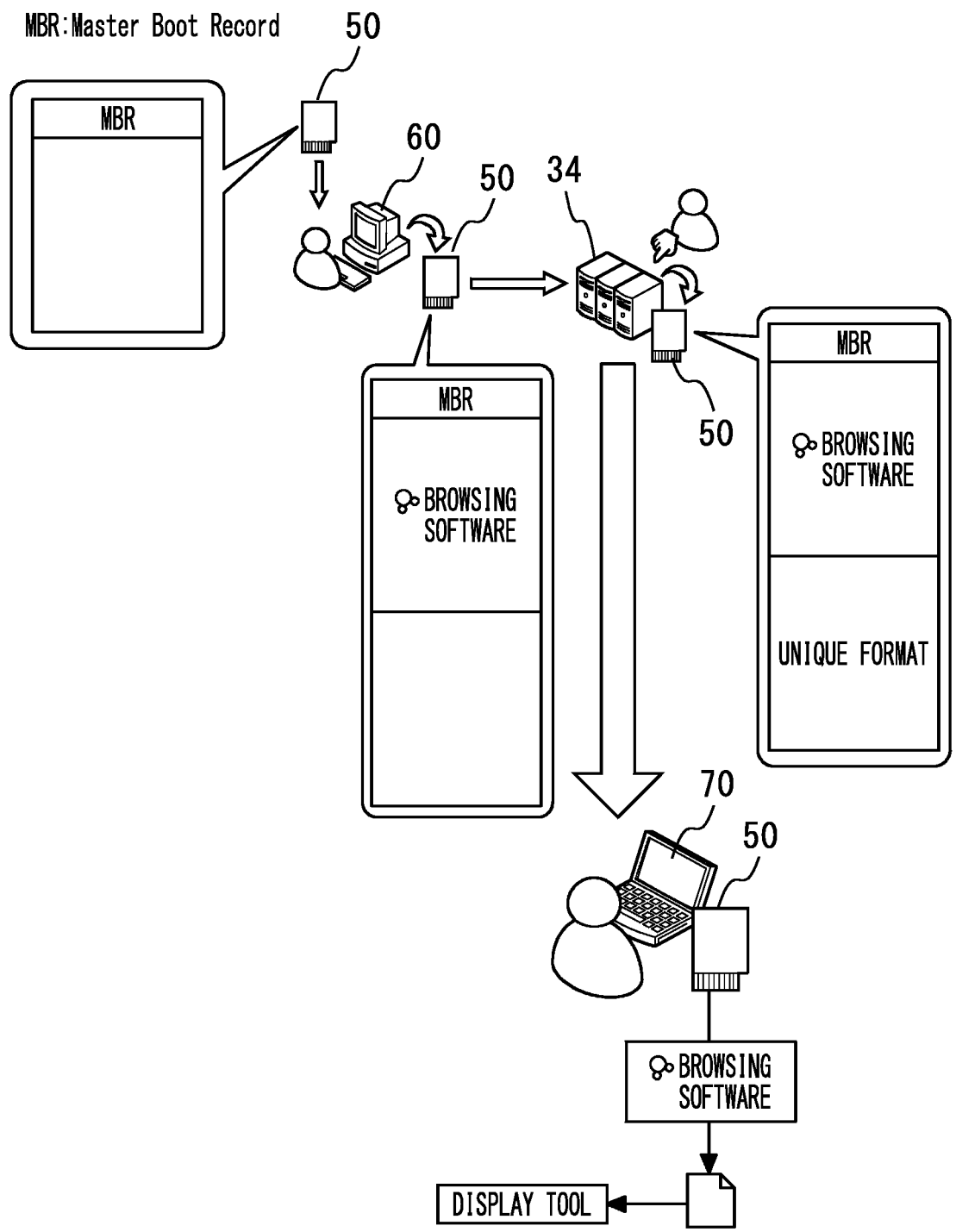
FIG. 2 is a block diagram to explain a method of implementing an external storage device for the control apparatus of the power conversion system according to Embodiment 1.

FIG. 2 is a block diagram to explain a method of implementing the external storage device for the control apparatus of the power conversion system according to Embodiment 1.

As illustrated in FIG. 2, a manufacturer prepares the common external storage device 50. Thereafter, the manufacturer formats the external storage device 50 by a function of an operation system of a first terminal apparatus 60 such as a common desktop persona computer. As a result, an area of the external storage device 50 is divided into an area supporting a file system applied to a terminal apparatus such as a common persona computer and an empty area. At this time, data of browsing software and the like is arranged in the area supporting the file system applied to the terminal apparatus such as the common persona computer.

Thereafter, the manufacturer mounts the external storage device 50 on the control apparatus 34. Thereafter, a user or the manufacturer initializes the external storage device 50. As a result, a unique format not using the file system applied to the terminal apparatus such as the common persona computer is applied to the empty area of the external storage device 50.

After the control apparatus 34 stores the various kinds of data from the power conversion system 10 in the external storage device 50, the user or the manufacturer takes out the external storage device 50 from the control apparatus 34. Thereafter, the user or the manufacturer mounts the external storage device 50 on a second terminal apparatus 70 such as a common laptop persona computer. Thereafter, the user or the manufacturer browses, on the second terminal apparatus 70, a Bank list of data recorded in the unique format that cannot be browsed through a common operation software, by using data of the browsing software stored in the external storage device 50.

The user or the manufacturer browses, on the second terminal apparatus 70, a list of the various kinds of data from the power conversion system 10 by using a function of the browsing software stored in the external storage device 50, and exports selected data in a form of a trace file as necessary. The user or the manufacturer causes a common display tool to display contents of the data.

Figure 3:
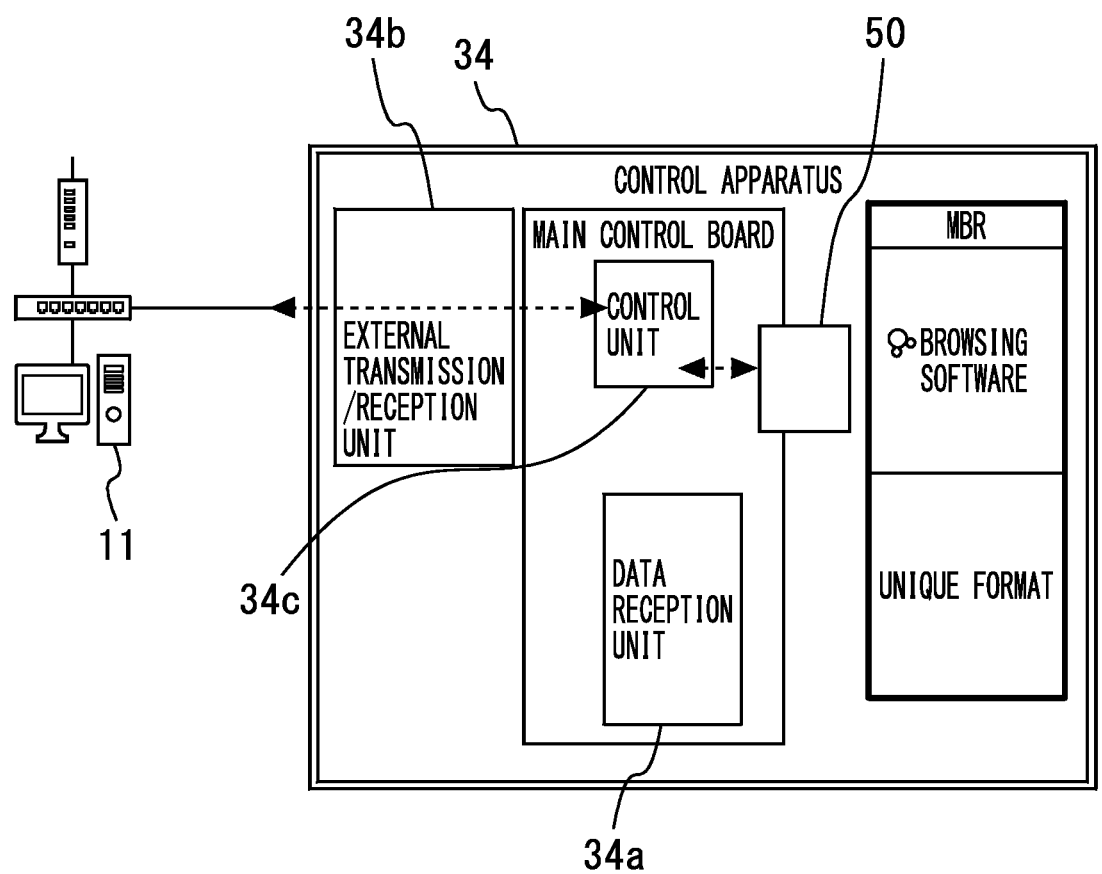
FIG. 3 is a diagram to explain operation of the control apparatus of the power conversion system according to Embodiment 1.

Next, operation of the control apparatus 34 is described with reference to FIG. 3. FIG. 3 is a diagram to explain the operation of the control apparatus of the power conversion system according to Embodiment 1.

As illustrated in FIG. 3, the control apparatus 34 includes a data reception unit 34a, an external transmission/reception unit 34b, and a data control unit 34c.

The data reception unit 34a receives the various kinds of data from the power conversion system 10. The external transmission/reception unit 34b performs transmission/reception of various kinds of data between the external host monitoring apparatus 11 and the control apparatus 34. For example, the data control unit 34c is an industrial built-in microcomputer having a small capacity for programs. The data control unit 34c controls processing of various kinds of data.

For example, the data control unit 34c writes data received by the data reception unit 34a, in the external storage device 50. For example, the data control unit 34c reads data stored in the external storage device 50, and causes the external transmission/reception unit 34b to transmit the data to the host monitoring apparatus 11 by an industrial communication protocol.

Next, overview of the areas of the external storage device 50 is described with reference to FIG. 4.

Figure 4:
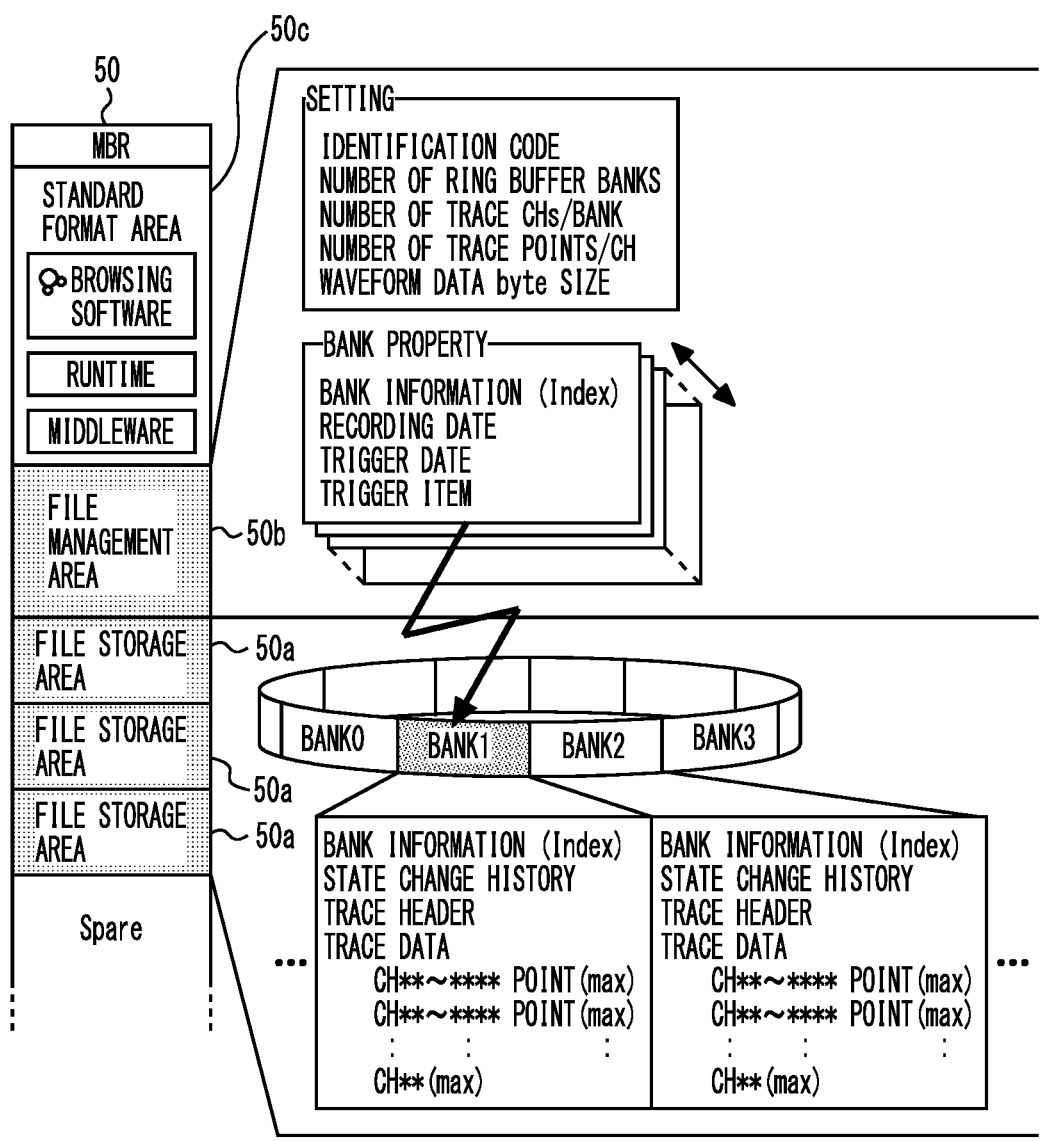
FIG. 4 is a diagram to explain overview of areas of the external storage device for the control apparatus of the power conversion system according to Embodiment 1.

FIG. 4 is a diagram to explain the overview of the areas of the external storage device for the control apparatus of the power conversion system according to Embodiment 1.

As illustrated in FIG. 4, an area of the external storage device 50 is divided into a plurality of file storage areas 50a, a file management area 50b, and a standard format area 50c.

The plurality of file storage areas 50a stores the various kinds of data from the power conversion system 10. The plurality of file storage areas 50a are areas in a ring buffer format. For example, data on "BANK information (Index)", "state change history", "trace header", and "trace data" is stored in each of the plurality of file storage areas 50a.

The file management area 50b manages data for setting a format not using the file system applied to the terminal apparatus such as the common persona computer, as a format for storage of the data in the plurality of file storage areas 50a. For example, data on "setting" and a plurality of "BANK properties" is stored in the file management area 50b.

For example, the data on "setting" includes data on "identification code", "number of ring buffer BANKs", "number of trace CHs/BANK", "number of trace points/CH", and "wave data byte size".

For example, the data on "BANK property" includes data on "BANK information (Index)", "recording date", "trigger date", and "trigger item".

The standard format area 50c supports the file system applied to the terminal apparatus such as the common personal computer. Data of "browsing software", "runtime", and "middleware" applied to the terminal apparatus such as the common personal computer is stored in the standard format area 50c.

The data of "browsing software" is data of the browsing software for the terminal apparatus to read out data stored in the plurality of file storage areas 50a. The data of "runtime" is data of runtime used by the terminal apparatus to read out data stored in the plurality of file storage areas 50a. The data of "middleware" is data of middleware used by the terminal apparatus to read out data stored in the plurality of file storage areas 50a.

According to Embodiment 1 described above, the unique format is adopted. Storage using the unique format makes the program size smaller than in the case of storage using a common file system. Therefore, the data from the power conversion system 10 can be written even by a program small in size.

Further, the external storage device 50 stores the data from the power conversion system 10, in the ring buffer format. Therefore, even in a case where a storage capacity of the external storage device 50 is small, the latest data can be written.

Further, the external storage device 50 stores the data of the browsing software applied to the terminal apparatus. Therefore, the terminal apparatus can perform processing such as list display of the data from the power conversion system 10 by using the browsing software.

Further, the external storage device 50 stores the data of runtime applied to the terminal apparatus. Therefore, the terminal apparatus can perform the processing such as list display of the data from the power conversion system 10 by using the browsing software.

Further, the external storage device 50 stores the data of middleware applied to the terminal apparatus. Therefore, the terminal apparatus can perform processing such as list display of the data from the power conversion system 10 by using the browsing software.

Further, the control apparatus 34 transmits the data stored in the external storage device 50 to the host monitoring apparatus 11. At this time, it is sufficient for the control apparatus 34 to transmit data written in at least one of the plurality of file storage areas 50a of the external storage device 50 based on the format not using the file system applied to the terminal apparatus. As a result, the host monitoring apparatus 11 can appropriately acquire state information on the power conversion system 10.

Further, the external storage device 50 according to Embodiment 1 may be applied to a control apparatus of a power converter that converts alternating-current power into direct-current power.

Next, an example of the host monitoring apparatus 11 is described with reference to FIG. 5.

Figure 5:
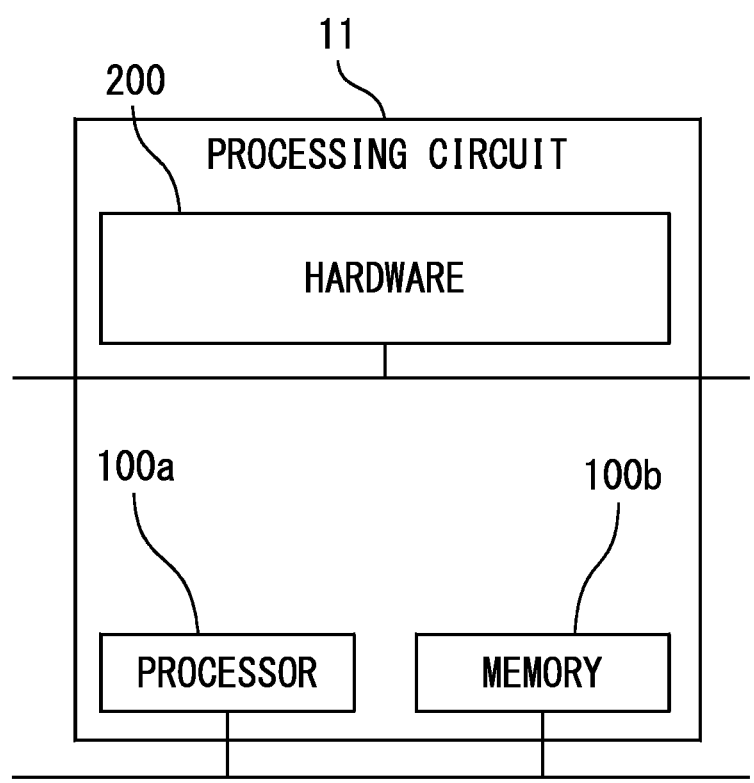
FIG. 5 is a hardware configuration diagram of a host monitoring apparatus transmitting/receiving data to/from the control apparatus of the power conversion system according to Embodiment 1.

FIG. 5 is a hardware configuration diagram of the host monitoring apparatus transmitting/receiving data to/from the control apparatus of the power conversion system according to Embodiment 1.

The functions of the host monitoring apparatus 11 can be realized by a processing circuit. For example, the processing circuit includes at least one processor 100a and at least one memory 100b. For example, the processing circuit includes at least one dedicated hardware 200.

In a case where the processing circuit includes the at least one processor 100a and the at least one memory 100b, the functions of the host monitoring apparatus 11 are realized by software, firmware, or a combination of the software and the firmware. At least one of the software and the firmware is described as a program. At least one of the software and the firmware is stored in the at least one memory 100b. The at least one processor 100a reads out and executes programs stored in the at least one memory 100b, thereby realizing the functions of the host monitoring apparatus 11. The at least one processor 100a is also referred to as a central processing unit, a processing device, a calculation device, a microprocessor, a microcomputer, or a DSP. For example, the at least one memory 100b is a nonvolatile or volatile semiconductor memory such as a RAM, a ROM, a flash memory, an EPROM, and an EEPROM, a magnetic disk, a flexible disk, an optical disk, a compact disk, a minidisk, or a DVD.

In a case where the processing circuit includes the at least one dedicated hardware 200, the processing circuit is realized by, for example, a single circuit, a composite circuit, a programmed processor, a parallel-programmed processor, an ASIC, an FPGA, or a combination thereof. For example, the functions of the host monitoring apparatus 11 are each realized by the processing circuit. For example, the functions of the host monitoring apparatus 11 are collectively realized by the processing circuit.

A part of the functions of the host monitoring apparatus 11 may be realized by the dedicated hardware 200, and the other part may be realized by the software or the firmware. For example, a function to monitor the state of the power conversion system 10 may be realized by the processing circuit as the dedicated hardware 200, and the functions other than the function to monitor the state of the power conversion system 10 may be realized in such a manner that the at least one processor 100a reads out and executes programs stored in the at least one memory 100b.

As described above, the processing circuit realizes the functions of the host monitoring apparatus 11 by the hardware 200, the software, the firmware, or a combination thereof.

Although not illustrated, the functions of the first terminal apparatus 60 are also realized by a processing circuit equivalent to the processing circuit realizing the functions of the host monitoring apparatus 11. The functions of the second terminal apparatus 70 are also realized by a processing circuit equivalent to the processing circuit realizing the functions of the host monitoring apparatus 11.

INDUSTRIAL APPLICABILITY

As described above, the external storage device for the control apparatus of the power conversion system and the control apparatus of the power conversion system according to the present disclosure are usable for the power system.

REFERENCE SIGNS LIST

2 Solar cell panel
2a Output terminal
2b Output terminal
4 Power system
6 Transformer
10 Power conversion system
11 Host monitoring apparatus
12 Power converter
12a Switching element
12b Rectification element
14 Direct-current capacitor
16 Filter circuit
16a Inductor
16b Capacitor
18 Direct-current voltage detector
20 Direct current detector
22a to 22c Alternating-current voltage detector
24a to 24c Alternating current detector
26a, 26b Direct-current switch (direct-current breaker)

28a to 28c Alternating-current switch (alternating-current breaker)
34 Control apparatus
34a Data reception unit
34b External transmission/reception unit
34c Data control unit
50 External storage device
50a File storage area
50b File management area
50c Standard format area
60 First terminal apparatus
70 Second terminal apparatus

The invention claimed is:

1. An external storage device for a control apparatus of a power conversion system detachably connected to the control apparatus provided in the power conversion system, the external storage device comprising:
a plurality of file storage areas each storing various data including a voltage value, a frequency, and a temperature acquired by the power conversion system; and
a file management area configured to manage data for setting a format not using a file system applied to a terminal apparatus, as a format for storage of the various data in the plurality of file storage areas, wherein
the control apparatus is a microcomputer having a small program capacity,
the file management area is configured to store setting data and a plurality of BANK property data,
the setting data includes an identification code, a ring buffer BANK number, a trace channel number for each BANK, trace points for each channel, and a byte size of waveform data, and
each BANK property data includes BANK information including an index, a recording date and time when data is recorded, a trigger date and time, and a trigger item.

2. The external storage device for the control apparatus of the power conversion system according to claim 1, wherein the file management area is configured to manage data for setting a ring buffer format as the format for storage of the data in the plurality of file storage areas.

3. The external storage device for the control apparatus of the power conversion system according to claim 2, further comprising a standard format area configured to store data of browsing software for the terminal apparatus to read out the data stored in the plurality of file storage areas.

4. The external storage device for the control apparatus of the power conversion system according to claim 1, further comprising a standard format area configured to store data of browsing software for the terminal apparatus to read out the data stored in the plurality of file storage areas.

5. The external storage device for the control apparatus of the power conversion system according to claim 4, wherein the standard format area stores data of a runtime used by the terminal apparatus to read out the data stored in the plurality of file storage areas.

6. The external storage device for the control apparatus of the power conversion system according to claim 5, wherein the standard format area stores data of middleware used by the terminal apparatus to read out the data stored in the plurality of file storage areas.

7. The external storage device for the control apparatus of the power conversion system according to claim 4, wherein the standard format area stores data of middleware used by the terminal apparatus to read out the data stored in the plurality of file storage areas.

8. A control apparatus of a power conversion system connected to an external storage device including a plurality of file storage areas and a file management area, comprising:
data reception circuitry configured to receive various data including a voltage value, a current value, a frequency, and a temperature acquired from the power conversion system; and
data control circuitry configured to write the various data received by the data reception circuitry in the plurality of file storage areas, wherein
the plurality of file storage areas are configured to store the various data,
the file management area is configured to manage data for setting a format not using a file system applied to a terminal apparatus, as a format for storage of the various data in the plurality of file storage areas,
the file management area is configured to store setting data and a plurality of BANK property data,
the setting data includes an identification code, a ring buffer BANK number, a trace channel number for each BANK, trace points for each channel, and a byte size of waveform data, and
each BANK property data includes BANK information including an index, a recording date and time when data is recorded, a trigger date and time, and a trigger item.

9. The control apparatus of the power conversion system according to claim 8, further comprising:
external transmission/reception circuitry configured to transmit/receive data to/from outside, wherein
the data control circuitry is further configured to read data written in at least one of the plurality of file storage areas based on the format set in the file management area, and causes the external transmission/reception circuitry to transmit the data to a host monitoring apparatus.

* * * * *